W. N. ROBISON.
SYSTEM OF SUBIRRIGATION.
APPLICATION FILED JAN. 24, 1911.
1,015,401. Patented Jan. 23, 1912.
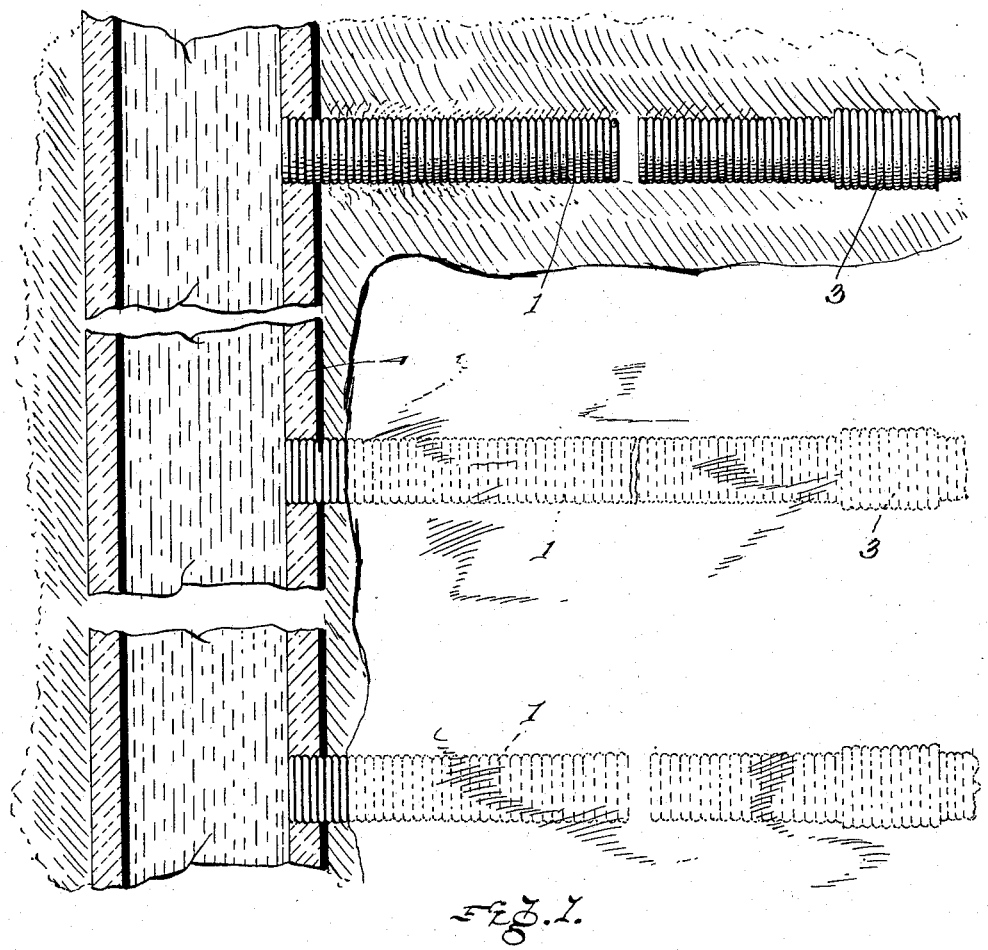
Fig. 1.
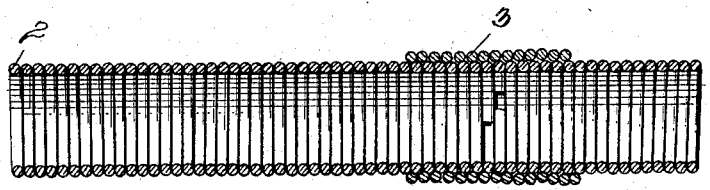
Fig. 3.   Fig. 2.
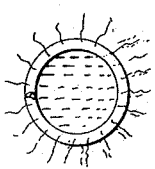
WITNESSES
INVENTOR
William N. Robison.

UNITED STATES PATENT OFFICE.

WILLIAM N. ROBISON, OF CANYON, TEXAS.

SYSTEM OF SUBIRRIGATION.

1,015,401.     Specification of Letters Patent.     Patented Jan. 23, 1912.

Application filed January 24, 1911. Serial No. 604,464.

*To all whom it may concern:*

Be it known that I, WILLIAM N. ROBISON, a citizen of the United States, residing at Canyon, in the county of Randall and State of Texas, have invented certain new and useful Improvements in Systems of Subirrigation, of which the following is a specification, reference being had therein to the accompanying drawing.

This invention relates to subirrigation of land and has for its object to provide an improved system of subirrigation in which pipes are employed formed of coiled wire having seams between its coils separable under pressure in the pipe.

The invention further has for its object to provide such an improved system of sub-irrigation of land that the land in which the pipes constructed in accordance with this invention are located will be thoroughly and effectively irrigated, said pipes being prevented from being choked up by roots and other matter.

The invention further has for its object to provide an improved system of subirrigation of land embodying the arrangement of a number of sections of pipes formed of expansible tubes of coiled wire having seams between the coils separable under internal pressure in the pipe in conjunction with a water supply main.

Referring to the accompanying drawing: Figure 1 is a plan view showing a portion of several sub-irrigation pipes, showing the sub-irrigation system constructed in accordance with this invention and embedded in the ground, and in longitudinal section a cement tile partly broken away and connected with said pipes. Fig. 2 is a detail view in longitudinal section of the adjacent ends of a portion of two sub-irrigation pipes constructed in accordance with this invention and coupled together. Fig. 3 is a detail view showing the end of a sub-irrigation pipe constructed in accordance with this invention and the manner of the passage of water through said pipe.

In carrying out this invention sub-irrigation pipes 1 are provided, each of which is formed of wire 2 of appropriate size, preferably ranging from 2 inches down, as for example, from No. 12 wire to No. 17 wire. The pipes 1 are preferably each formed of a length of wire containing about 100 pounds of wire, and preferably of galvanized iron so as not to rust. The coils of the pipes 1 so formed will yield to certain internal pressure of water therein so as to permit of the passage of water between said coils, the openings formed by the separation of the coils being sufficient for the proper distribution of water to the surrounding earth, but not wide enough to admit of roots and other foreign matter. In using these pipes they are preferably formed in sections of pipe coupled together in any suitable manner, and, as here shown, preferably by means of a coupling 3 which is a short tube of wire a little larger than the pipes which it couples. The pipes 1, of which there are a number coupled together, by the couplings 3, are connected to a transverse tile 4, preferably of cement on account of cheapness, said tile having holes in which the ends of the sections of pipe 1 are fitted.

The invention is advantageous in that it can be made very rapidly by machinery and at little cost. It can also be rapidly laid by machinery, delays only occurring in coupling the lengths of the pipe together. It is comparatively light, which lessens the cost of shipping and handling. It distributes water evenly, as it can ooze out between the coils of wire which are, at the same time, so close that roots cannot get into the pipe, thereby overcoming the great difficulty encountered in sub-irrigation. The pipes will not be affected by freezing and there will be no loss from breaking. By means of the construction of the pipe hereinbefore described a large amount of water can be supplied and distributed.

In carrying out the invention the pipes are laid in the ground with the earth loosely placed about them so as to permit of longitudinal or slightly buckling movement due to the pressure of the water in the pipe. The soil in which the pipes are laid is not packed closely about the same to prevent the discharge of water out of the pipe, and the pipes are free to adjust themselves to any irregularity arising from the water pressure therein.

Having described the invention, what I claim as new is:

1. A system of subirrigation comprising pipes, each formed of an expansible tube of coiled wire having seams between its coils separable under internal pressure in the pipe, and a water supply main connected with said pipes.

2. A system of sub-irrigation of the kind described comprising a pipe for sub-irrigation formed in sections of elastic coiled wire, the coils of said sections being normally held together and separable under internal pressure in the pipe, said sections of pipe being coupled together.

3. A system of sub-irrigation of the kind described comprising a pipe for sub-irrigation formed in sections of pipe composed of yielding coiled wire having its coils normally closed together and separable under internal pressure in the pipe to form openings for the distribution of water, and a coupling connecting the ends of said pipes, and formed of a short tube of coiled wire.

4. A system of sub-irrigation of the kind described comprising a water supply main formed with openings located at intervals apart, and a number of sub-irrigation pipes, said pipes being each connected at one end with an opening in said water supply main and each of said pipes being formed of coiled wire having its coils normally pressed together, and separable under internal pressure in the pipe to form openings for the distribution of water.

In testimony whereof I hereunto affix my signature in presence of two witnesses.

WILLIAM N. ROBISON.

Witnesses:
E. J. BELL,
GEO. A. BRANDON.

Copies of this patent may be obtained for five cents each, by addressing the "Commissioner of Patents, Washington, D. C."